US006907446B1

(12) United States Patent
Balassanian

(10) Patent No.: US 6,907,446 B1
(45) Date of Patent: Jun. 14, 2005

(54) METHOD AND SYSTEM FOR DYNAMIC DELIVERY OF BEADS

(75) Inventor: Edward Balassanian, Kirkland, WA (US)

(73) Assignee: Implicit Networks, Inc., Bellevue, WA (US)

( * ) Notice: Subject to any disclaimer, the term of this patent is extended or adjusted under 35 U.S.C. 154(b) by 730 days.

(21) Appl. No.: 09/706,456

(22) Filed: Nov. 3, 2000

Related U.S. Application Data

(60) Provisional application No. 60/240,683, filed on Oct. 16, 2000.

(51) Int. Cl.[7] ............................................. G06F 15/16
(52) U.S. Cl. ........................ 709/203; 705/52; 717/178; 719/320
(58) Field of Search ................................. 709/248, 203; 717/5, 11, 101, 124, 178; 705/51, 52; 719/320

(56) References Cited

U.S. PATENT DOCUMENTS

| | | | |
|---|---|---|---|
| 5,710,917 A | | 1/1998 | Musa et al. |
| 6,295,645 B1 | * | 9/2001 | Brewer ....................... 717/178 |
| 6,324,685 B1 | * | 11/2001 | Balassanian ................ 717/118 |
| 6,334,118 B1 | * | 12/2001 | Benson ......................... 705/52 |
| 6,601,018 B1 | * | 7/2003 | Logan ......................... 705/186 |
| 6,658,642 B1 | * | 12/2003 | Megiddo et al. ............ 717/101 |
| 6,662,236 B1 | * | 12/2003 | Apte et al. .................. 719/320 |

OTHER PUBLICATIONS

Bhatti, Nina T., et al., "Coyote: A System for Constructing Fine–Grain Configurable Communication Services," The University of Arizona at Tucson, ACM Transactions on Computer Systems, vol. 16, No. 4, Nov. 1998, pp. 321–366.

O'Malley, Sean W. and Larry L. Peterson, "A Dynamic Network Architecture, " University of Arizona, ACM Transactions on Computer Systems (TOCS), vol. 10, No. 2, May 1992, pp. 110–143.

Fiuczynski, Marc E. and Brian N. Bershad, "An Extensible Protocol Architecture for Application–Specific Networking," University of Washington at Seattle, Proceedings of the 1996 Winter USENIX Technical Conference.

Pardyak, Przemyslaw and Brian N. Bershad, "Dynamic Binding for an Extensible System," University of Washington at Seattle, Proceedings of the Second USENIX Symposium on Operating Systems Design and Implementation (OSDI) 1996.

Bailey, Mary L. et al., "PathFinder: A Pattern–Based Packet Classifier," University of Arizona at Tucson, Proceedings of the First Symposium on Operating Systems Design and Implementation, USENIX Association, Nov. 1994.

Mosberger, David, "Scout: A Path–Based Operating System," A Dissertation Submitted to the Faculty of the Department of Computer Science, The University of Arizona, pp. 87–97, 1997.

* cited by examiner

*Primary Examiner*—Viet D. Vu.
*Assistant Examiner*—Jinsong Hu
(74) *Attorney, Agent, or Firm*—Morgan & Finnegan, LLP

(57) ABSTRACT

A method and system for providing target code to various computer systems. The target code is provided by a service. The service provides a mechanism for third-party developers to submit initial or base code for distribution to end-user computers as target code. The service converts the initial code to target code that is suitable for execution on the end-user computer. When the service receives the request for target code that matches certain requester-specified characteristics, it selects the intermediate code that best matches the requester-specified characteristics. The service then sends the target code to the requester.

15 Claims, 8 Drawing Sheets

METHOD AND SYSTEM FOR DYNAMIC DELIVERY OF BEADS

CROSS-REFERENCE TO RELATED APPLICATIONS

This application claims the benefit of U.S. Provisional Patent Application No. 60/240,683 filed on Oct. 16, 2000, and is related to U.S. patent application Ser. No. 60/084,350; entitled "PORTAL OPERATING SYSTEM " filed on May 5, 1998; U.S. patent application Ser. No. 09/040,972, patent entitled U.S. Pat. No. 6,324,685 "APPLICATION SERVER," filed on Mar. 18, 1998; U.S. patent application Ser. No. 60/084,343, entitled "DIGITAL HEAD AND GATEWAY," filed on May 5, 1998; U.S. patent application Ser. No. 09/304,973, pending entitled "METHOD AND SYSTEM FOR GENERATING A MAPPING BETWEEN TYPES OF DATA," filed on May 4, 1999; U.S. Provisional Patent Application No. 60/235,056, entitled "METHOD AND SYSTEM FOR DATA METERING," filed on Sep. 25, 2000; U.S. patent application Ser. No. 09/474,664, U.S. Pat. No. 6,629,163 entitled "METHOD AND SYSTEM FOR DATA DEMULTIPLEXING," filed on Dec. 29, 1999, U.S. patent application Ser. No. 09/478,920, U.S. Pat. No. 6,507,349 entitled "DIRECT MANIPULATION OF DISPLAYED CONTENT," filed on Jan. 6, 2000; U.S. patent application Ser. No. 09/688,581, pending entitled "FEATURE MANAGER SYSTEM FOR FACILITATING COMMUNICATION AND SHARED FUNCTIONALITY AMONG COMPONENTS," filed on Oct. 16, 2000; U.S. patent application Ser. No. 09/498,016 pending entitled "MEDIA ROUTING," filed on Feb. 4, 2000, the disclosures of which are incorporated herein by reference.

TECHNICAL FIELD

The disclosed technology relates to delivery of computer software, and in particular to dynamic delivery of custom beads to computer systems.

BACKGROUND

Many attempts have been made to integrate various aspects of communications between devices within a home computing and consumer electronic environment. These attempts, however, have typically been customized to allow communications between certain types of devices, but have not address the more generalized problem of communicating between a broader range of devices with incompatible formats. There are established standards for transmitting certain types of information from one device to another. For example, the audio output of a television can be connected to the audio input of an amplifier for directing the audio to the high-quality speakers attached to the amplifier. Similarly, the audio output associated with a computer system can also be directed to the amplifier. It might not, however, be possible to direct the audio output of a telephone to that same amplifier. More generally, there are limitations on to which devices output of certain devices can be directed. These limitations result primarily from not having a general solution for interconnecting the devices or converting the output in one format to an input format that is acceptable by another device. To direct the output of a telephone to an amplifier, one would need to identify and locate an appropriate conversion routine for converting the output format of the telephone to the input format of the amplifier. If such a conversion routine cannot be found, then one would need to program a special-purpose conversion routine. In addition, an appropriate transmission medium would need to be used to transmit the data from the telephone to the amplifier.

It would be desirable to have a technique in which such conversion routines could be easily identified, downloaded to a home computer, and installed.

DETAILED DESCRIPTION

Figure 1:
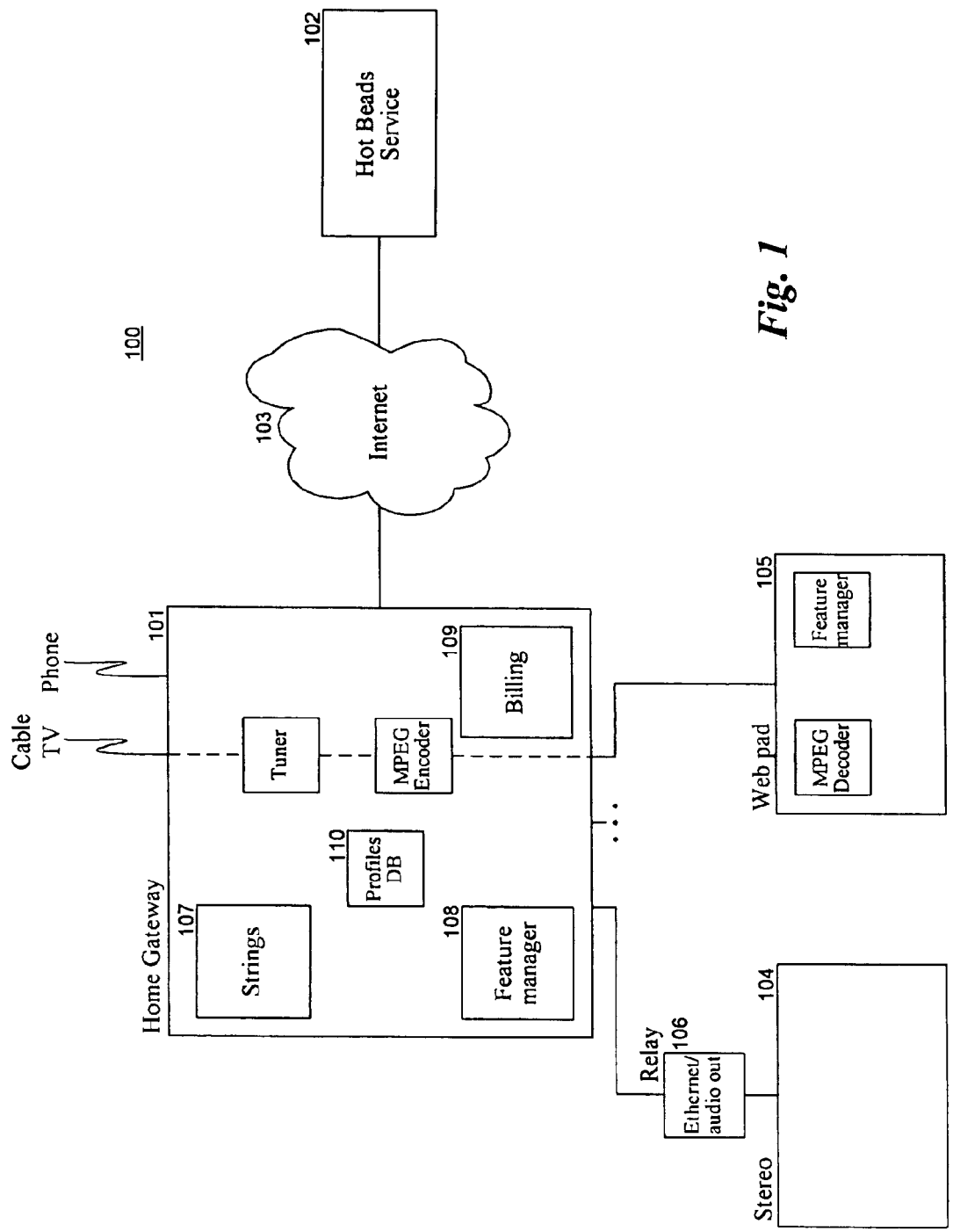
FIG. 1 is a block diagram illustrating the overall architecture of a home gateway system.

A method and system for providing target code to various computer systems is provided. In one embodiment, the target code is provided by a HotBeads service. The HotBeads service provides a mechanism for third-party developers to submit initial or base code for distribution to end-user computers as target code. The code (initial, intermediate, and target) is referred to as a "bead." The HotBeads service converts the initial code to target code that is suitable for execution on the end-user computers. The HotBeads service may verify whether the submitted initial code satisfies the developer-specified characteristics (e.g., whether the code correctly converts GIF to JPEG). The developer-specified characteristics may identify the overall function of the initial code and its compatible execution environments (e.g., operating system or processor). The HotBeads service may also translate the initial code, which may be source code, into an intermediate format. When the HotBeads service receives the request for target code that matches certain requester-specified characteristics, it selects the intermediate code that best matches the requester-specified characteristics. The HotBeads service may then perform various transformations on the intermediate code before compiling the intermediate code into a target code that is usable by the requester's computer. The transformations may include the optimizing of the code to use less memory or to execute faster. The HotBeads service then sends the target code to the requester.

The HotBeads service may use various billing models to charge for the providing of target code and to compensate for the receiving of initial code. The HotBeads service may compensate the developers of initial code based on the number of times that target code which derives from their initial code is sent to requesters. That compensation may also be based on quality of initial code as determined by the HotBeads service. The HotBeads service may charge requesters on a per-use basis, a flat fee basis for accessing unlimited target code or some combination of these bases. The requester may be charged directly or a third party associated with the requester (e.g., employer or service provider) may be charged. The fees charged may vary based on the requester-specified characteristics. For example, a requester may be charged a higher fee if certain optimizations of the target code is desired or if code from a specific developer is requested. A service provider may provide content to the user and use the HotBeads service to download the appropriate target code to the user's computer.

In one embodiment, the HotBeads service is implemented using the Strings operating environment. The Strings operating environment is described in the media mapping and demux patent applications, which are incorporated by reference. (Those patent applications use somewhat different terminology than used in this description. Those applications refer to the Strings operating environment as "Portal," to beads as "protocols," and to labels as "media.") Alternatively, only portions of the HotBeads service may use the Strings operating environment. For example, only the generating of target code from intermediate code might use the Strings operating environment. In one embodiment, the beads provided by the developers are intended to execute in the Strings environment on the requester's computer. The HotBeads service may perform verifications to ensure that a developer-provided bead is compatible with the Strings environment. For example, the HotBeads service may compile a bead and then invoke various functions of the Strings application programming interface ("API") to ensure that the results of the invocations are as expected.

FIG. 1 is a block diagram illustrating the overall architecture of a home gateway system. Such a home gateway system may connect to the HotBeads service to download beads on an as-needed basis. The home gateway system 100 includes a home gateway computer 101 that is interconnected to the HotBeads service 102 via the Internet 103. The home gateway computer is also connected to various appliances such as a stereo 104 and a web pad 105. Relays 106 may be used to convert data transmitted between the home gateway computer and the various appliances. For example, a stereo relay may receive packets of audio information via an Ethernet connection with home gateway computer, convert the packets to an audio format, and send the audio formatted data to a stereo. Certain appliances, such as a web pad, may include a Feature Manager and various decoders (e.g., an MPEG decoder). The Feature Manager decides which beads to download to the appliance and coordinates the downloading of the beads from the HotBeads service. The home gateway computer includes the Strings system 107, a Feature Manager 108, and a billing component 109. The home gateway computer may also include a profile database that contains information about the users of the appliances of the home gateway.

In operation, the home gateway computer may receive a request from a user via an appliance to access content through that appliance. For example, the user of a web pad may select a particular television channel to view at that web pad. The home gateway computer uses Strings to configure the beads for converting the television signal to a signal that is compatible with the web pad. In the example of FIG. 1, the web pad accepts an MPEG signal. Thus, Strings configures a tuner bead and an MPEG encoder bead to convert the tuner signal into an MPEG signal. The web pad may already include an MPEG decoder bead. If the gateway computer or the web pad does not have the appropriate beads for processing the television channel data, the Feature Manager requests an appropriate bead from the HotBeads service.

Figure 2:
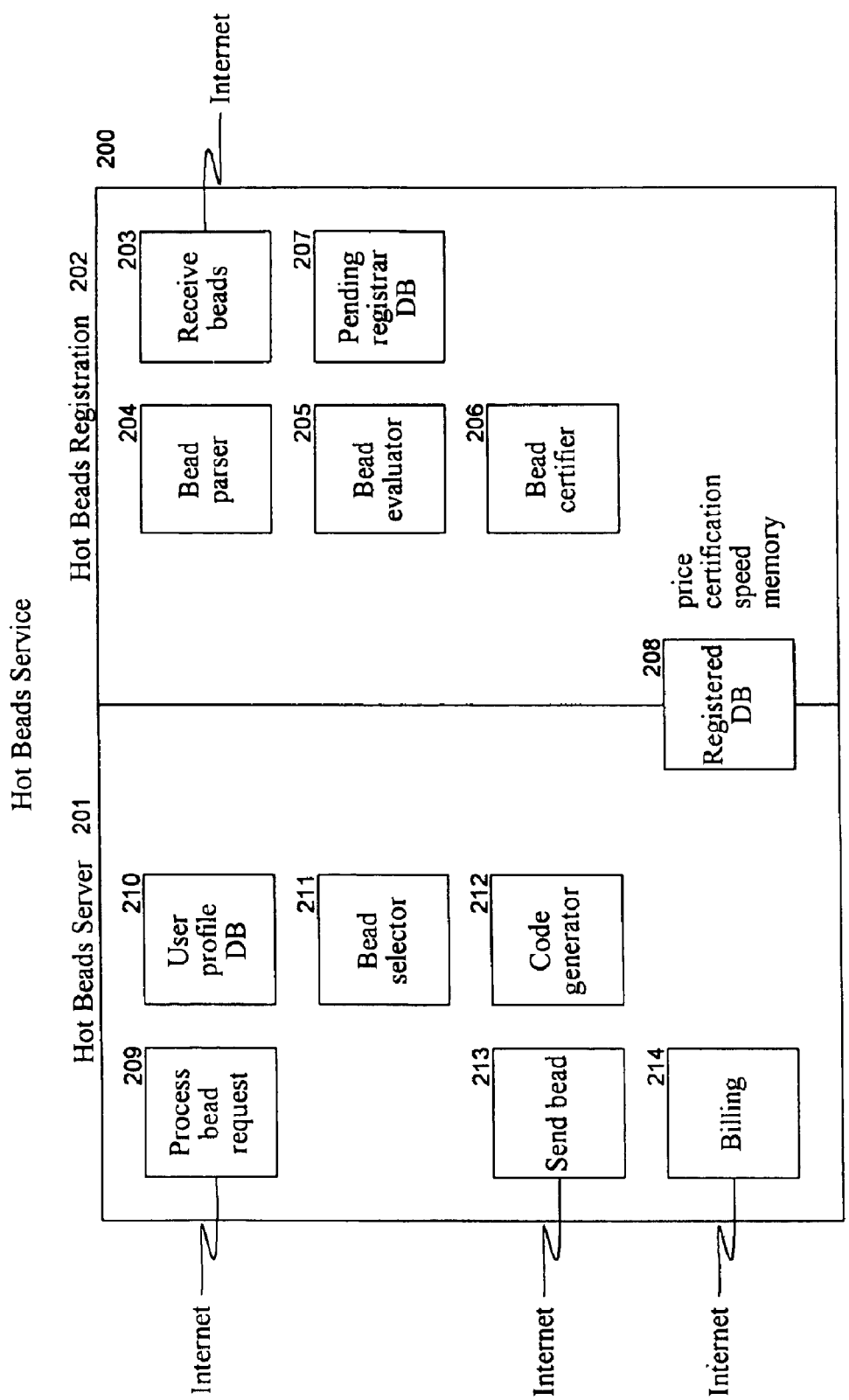
FIG. 2 is a block diagram illustrating components of the HotBeads service in one embodiment.

FIG. 2 is a block diagram illustrating components of the HotBeads service in one embodiment. The HotBeads service includes a HotBeads server 201 and a HotBeads register 202, which may be implemented on different computer systems. The HotBeads register facilitates the registering of beads developed by the provider of the HotBeads service or by third parties and stores those registered beads in the registration database. The HotBeads server receives requests for beads from the Feature Managers of the home gateway computers, selects the appropriate beads, generates the code for the beads, and sends the generated beads to the home gateway computers. The HotBeads server may also include a billing component. The billing component may bill the user directly (e.g., via credit card) or may bill a service provider that is providing the home gateway system to users for a monthly fee. The HotBeads register includes a receive beads component 203, a beads parser 204, a beads evaluator 205, a beads certifier 206, and a pending registration database 207. The receive beads component receives various beads that are to be registered and stores them in the pending registration database. The beads parser parses the received beads into an intermediate format, such as byte code format or a syntax tree format. The beads evaluator and the beads certifier ensure the correctness of the bead. To complete registration, the HotBeads register stores the information relating to the bead into the registration database 208. The HotBeads server includes a process bead request component 209, a user profile database 210, a bead selector 211, a code generator 212, a send bead component 213, and a billing component 214. The HotBeads server receives requests for beads, selects the appropriate bead based on either user profile and/or information in the request itself The HotBeads server then generates the executable code (e.g., 80×86 code) for the target appliance. In one embodiment, the HotBeads server may cache the generated code. The HotBeads server then sends the executable code to the target appliance via the home gateway computer. The HotBeads server uses the billing component to create a billing record for the bead that was downloaded.

Figure 3:
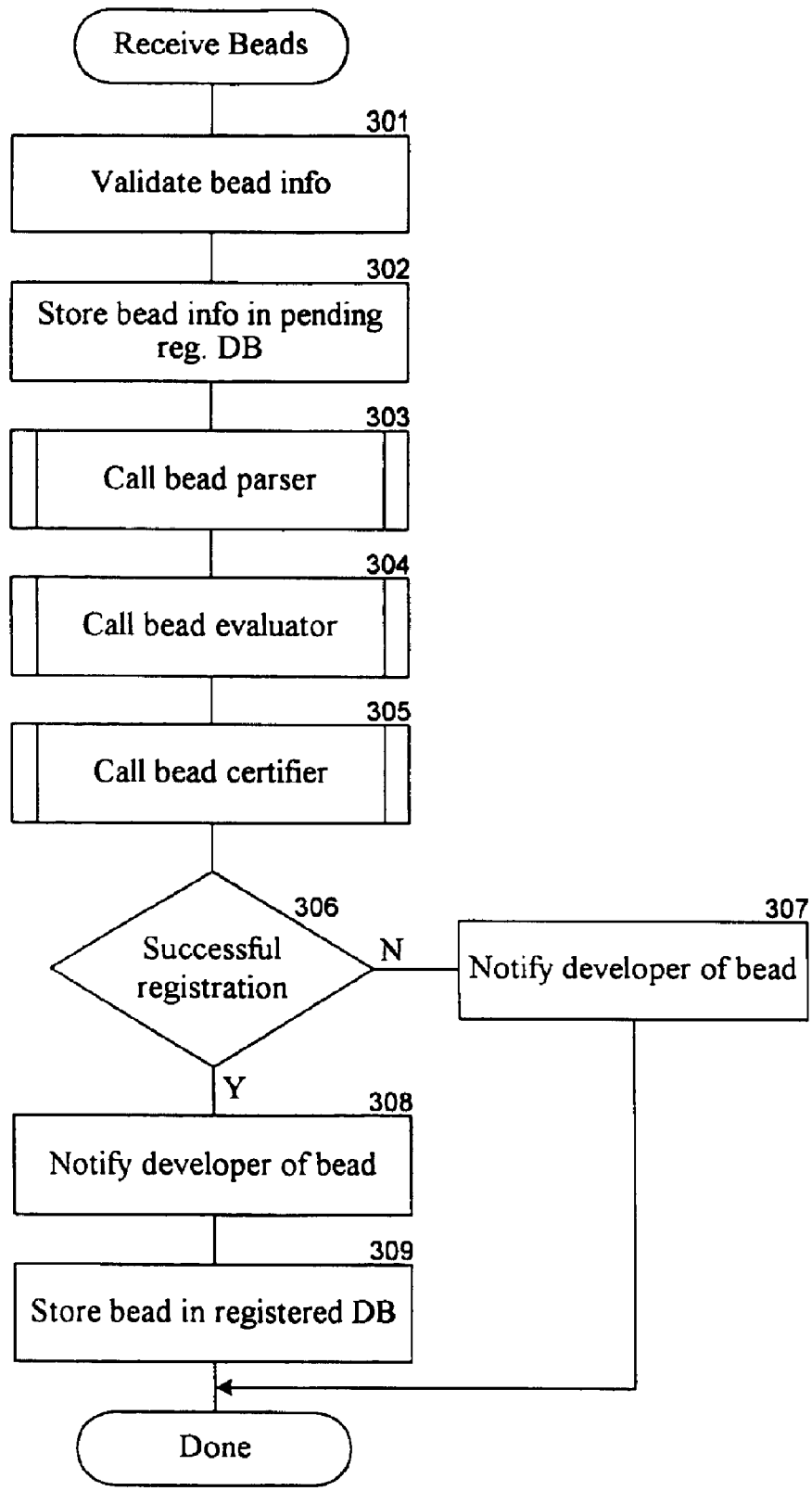
FIG. 3 is a flow diagram illustrating the processing of the receive beads component in one embodiment.

FIG. 3 is a flow diagram illustrating the processing of the receive beads component in one embodiment. The receive beads component receives beads provided by various developers, evaluates the beads, converts the beads to an intermediate format, and stores the beads in the intermediate format as registered beads. In block 301, the component validates the bead received from a developer. The validation may include determining whether the developer is authorized to submit beads. For example, certain developers who have a history of submitting low-quality beads may be barred from submitting beads. The validation may also ensure that the developer-specified characteristics of the bead is consistent and complete. In block 302, the component stores the bead information in the pending registration database. In block 303, the component invokes the beads parser component to convert the bead into an intermediate format. In block 304, the component invokes the beads evaluator to evaluate the quality of the bead. For example, the beads evaluator may identify that the bead attempts to execute in a privileged mode, rather than a user mode. In block 305, the component invokes the beads certifier. The beads certifier assigns a certification level to the bead, which may be based on the developer, evaluation of the bead itself, and so on. The certification level may be specified by a request for the bead. In which case, the HotBeads service may only send those beads that the meet the requested certification level. The HotBeads service may also evaluate the performance of the bead. For example, the HotBeads service may compile and execute the bead locally to determine speed of the bead, memory usage, and so on. The HotBeads service stores this information so that it can select beads that satisfy the requester-specified performance characteristics. In decision block 306, if the processing of the bead is successful, then the component continues at block 308, else the component notifies the developer that the will not be registered in block 307 and then completes. In block 308, the component notifies the developer that the bead has been registered. In block 309, the component stores the bead in the intermediate format in the registered database and then completes.

Figure 4:
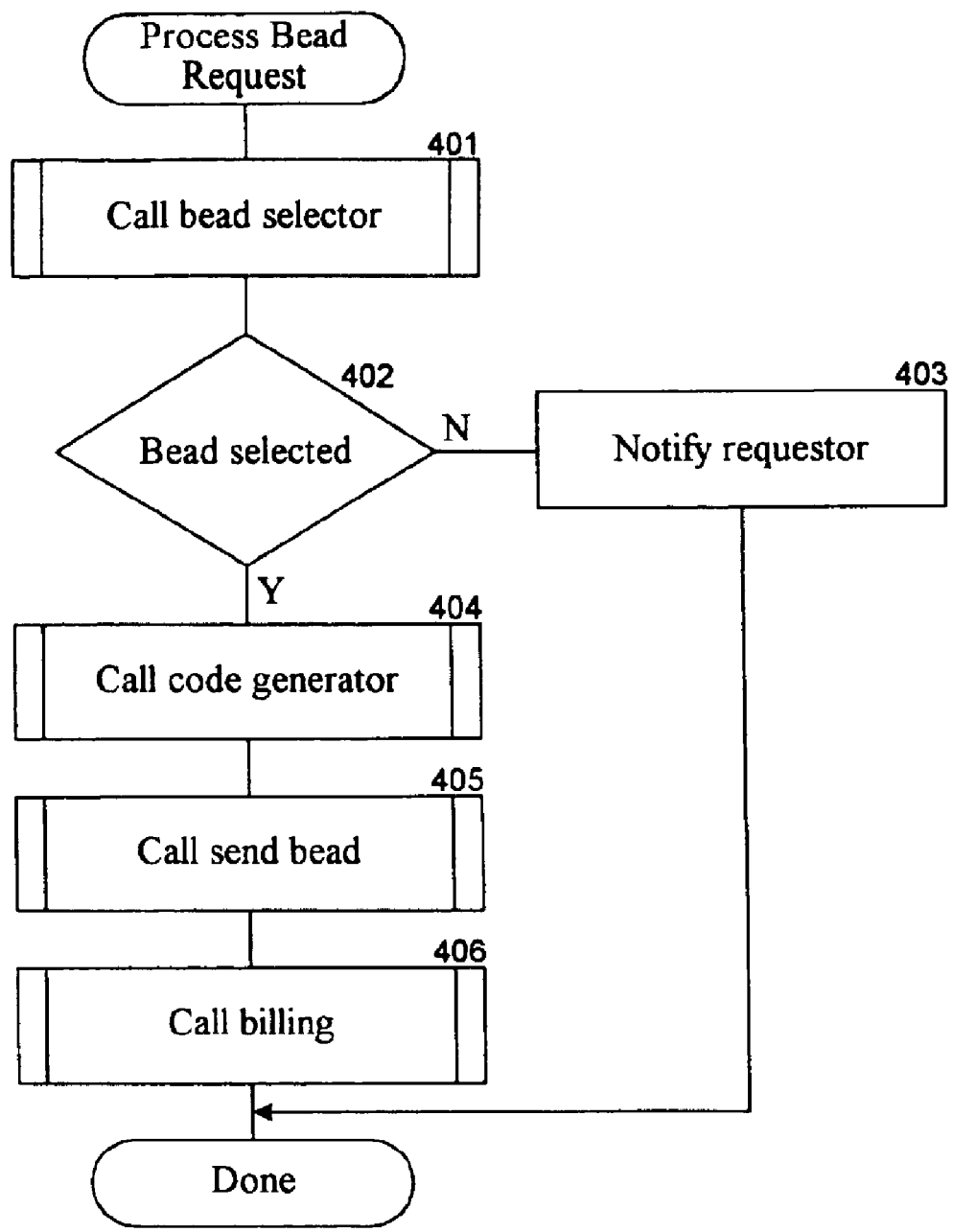
FIG. 4 is a flow diagram of the process bead request component.

FIG. 4 is a flow diagram of the process bead request component. This component is invoked when a bead request is received from the requester. In block 401, the component invokes the bead selector component to identify a bead that matches the requester-specified characteristics. In decision block 402, if a bead is selected that matches the requester-specified characteristics, then the component continues at block 404, else the component notifies the requester in block 403 and then completes. In a block 404, the component invokes the code generator to convert the selected bead into a target format that matches the requester-specified characteristics. In block 405, the component sends the bead in the target format to the requester. In block 406, the component invokes the billing component to account for the sending of the bead to the requester. The component then completes.

Figure 5:
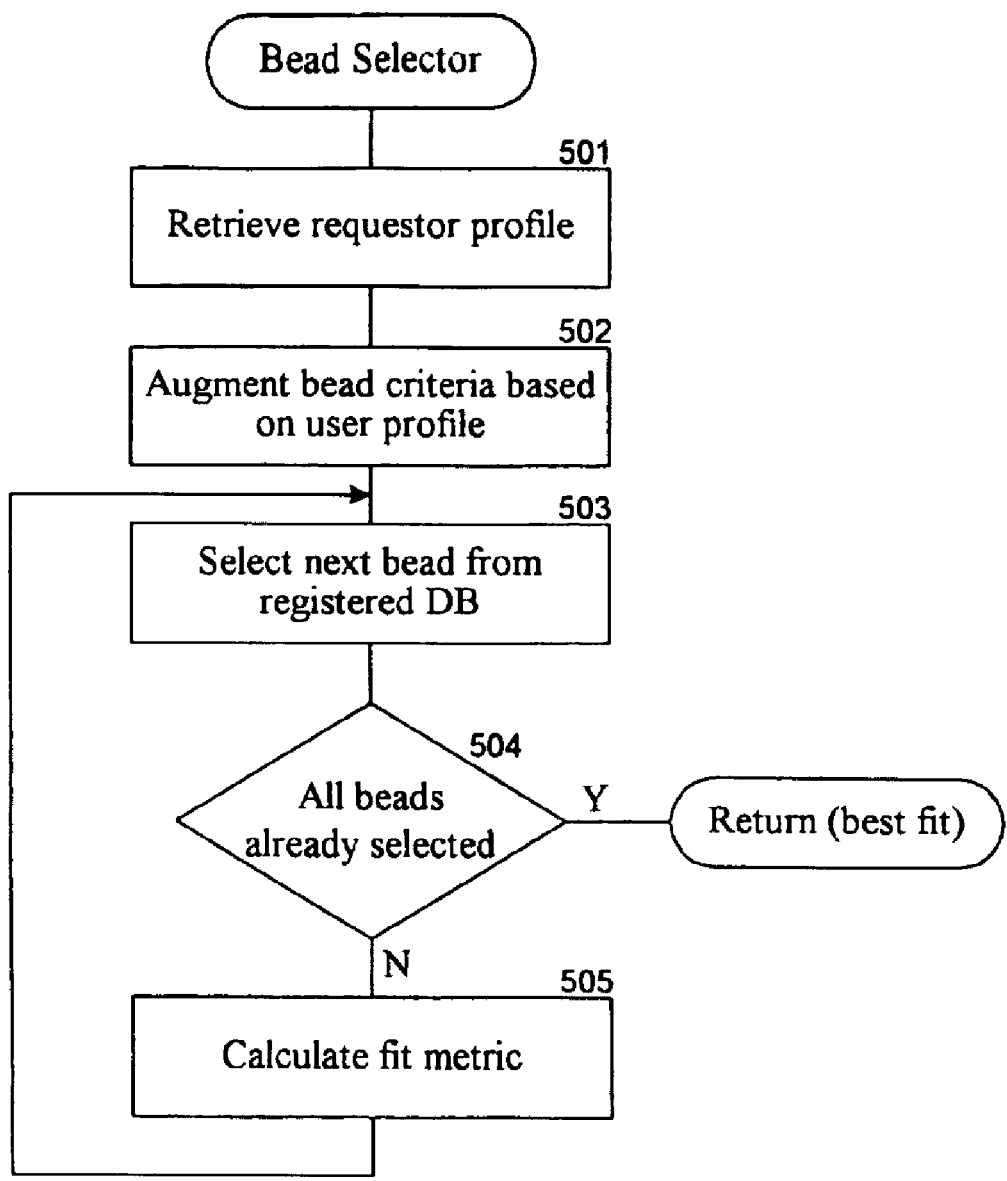
FIG. 5 a flow diagram of the bead selector component in one embodiment.

FIG. 5 is a flow diagram of the bead selector component in one embodiment. The bead selector component may be passed the identification of the requester and the requester-specified characteristics. In block 501, the component retrieves the requester profile from the requester profile database. In block 502, the component augments the requester-specified characteristics with the requester profile information. For example, the requester profile information may include the identification of the type of processor of the requester's target appliance. The requester-specified characteristics may include the function of the bead and pricing information, such as a not-to-exceed amount. In blocks 503–505, the component identifies the bead that best matches the requester-specified characteristics. In block 503, the component selects the next bead from the registered database. In decision block 504, if all the beads have already been selected, then the component returns the best bead, else the component continues at block 505. In block 505, the component calculates a metric for the selected bead on how well the bead meets the requester-specified criteria. The metric may be calculated using a lease-squares calculation based on the augmented requester-specified characteristics and characteristics stored in the registration database for the selected bead. The component then loops to block 503 to select the next bead. One skilled in the art will appreciate that many different techniques can be used for selecting a bead.

Figure 6:
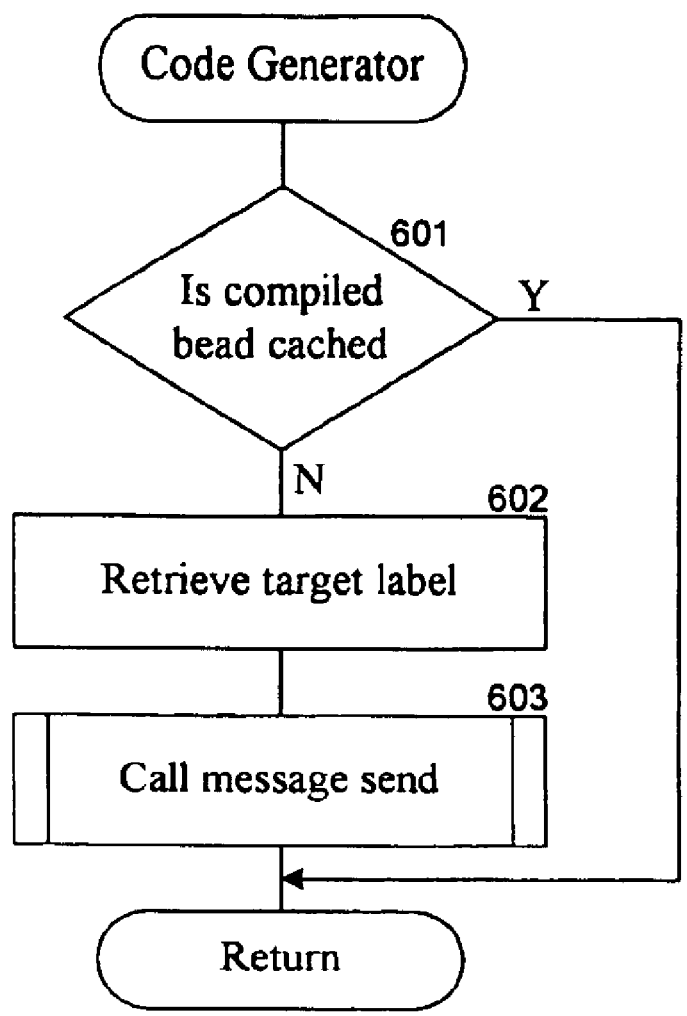
FIG. 6 is a flow diagram of the code generator component in one embodiment.

FIG. 6 is a flow diagram of the code generator component in one embodiment. The component is passed the identification of a bead and generates the target format for that bead in accordance with the requester-specified characteristics. In decision block 601, if the bead has already been generated and cached, then the component retrieves that bead and completes, else the component continues at block 602. In block 602, the component retrieves the target label that is consistent with requester-specified characteristics. The target label is used in the Strings operating environment to identify the target format for the bead. The HotBeads service may maintain a mapping from the various combinations of requester-specified characteristics to the target labels. The Strings operating environment uses the target label to identify the processing to be performed in generating the bead in the target format. For example, the target label may specify a certain sequence of optimization, compression, and compilation should be performed. Alternatively, the sequence of processing associated with a target label may be stored in the caches associated with the Strings operating environment as described in the media mapping application. In block 603, the component invokes the message send routine of the Strings environment. As described more fully in the demux application, the message send routine coordinates the identifying on the processing protocols (which are themselves beads) and the routing of the bead through those protocols. The component then returns.

Figure 7:
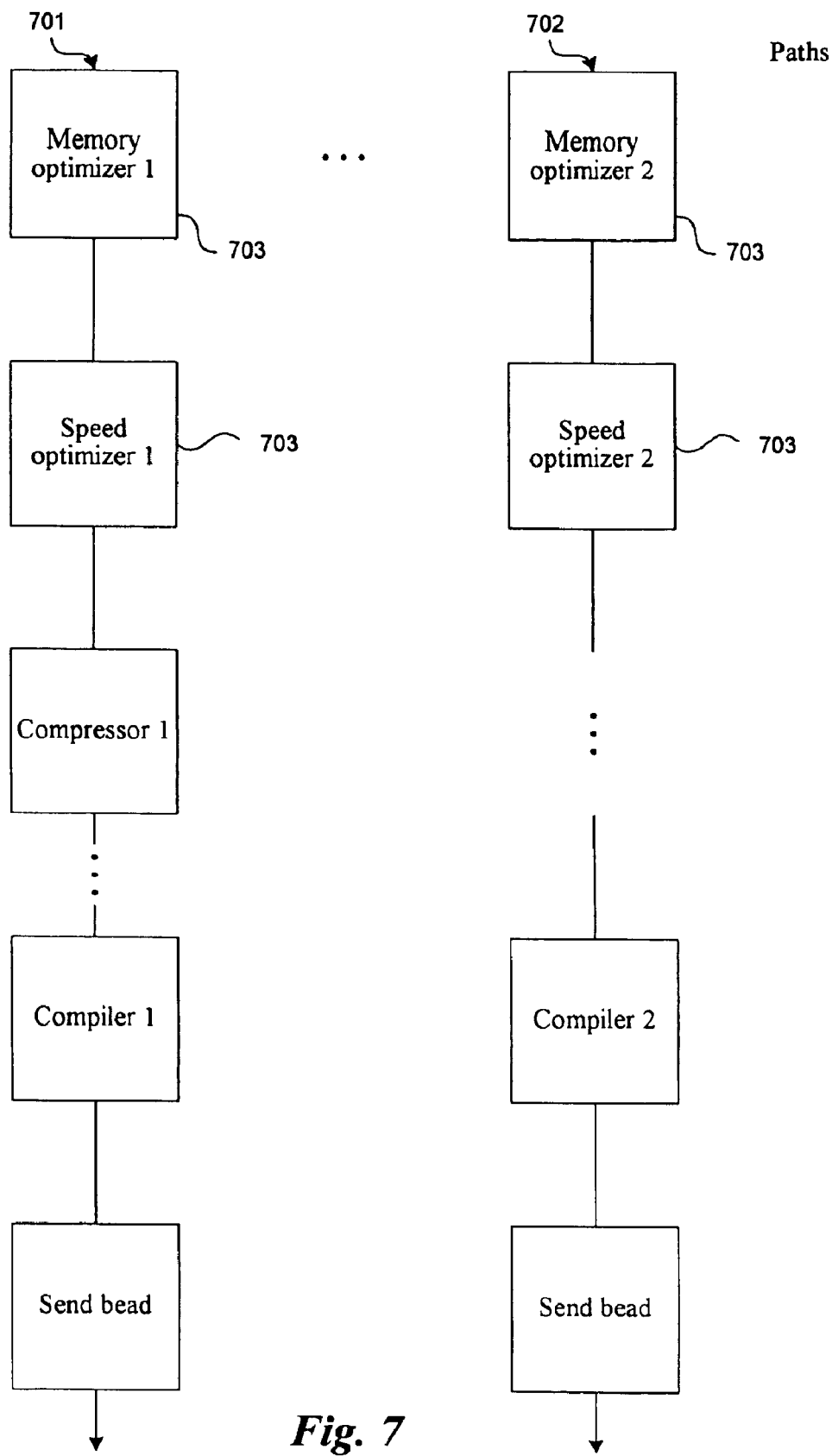
FIG. 7 is a block diagram illustrating the processing of the bead by the code generator.

FIG. 7 is a block diagram illustrating the processing of the bead by the code generator. Each path 701 and 702 corresponds to "string," and each protocol 703 corresponds to a "bead" on a string. In this example, string 701 includes one type of memory optimizer, and string 702 includes a different type of memory optimizer. Also, string 701 includes a compressor, which may not be included on string 702.

Figure 8:
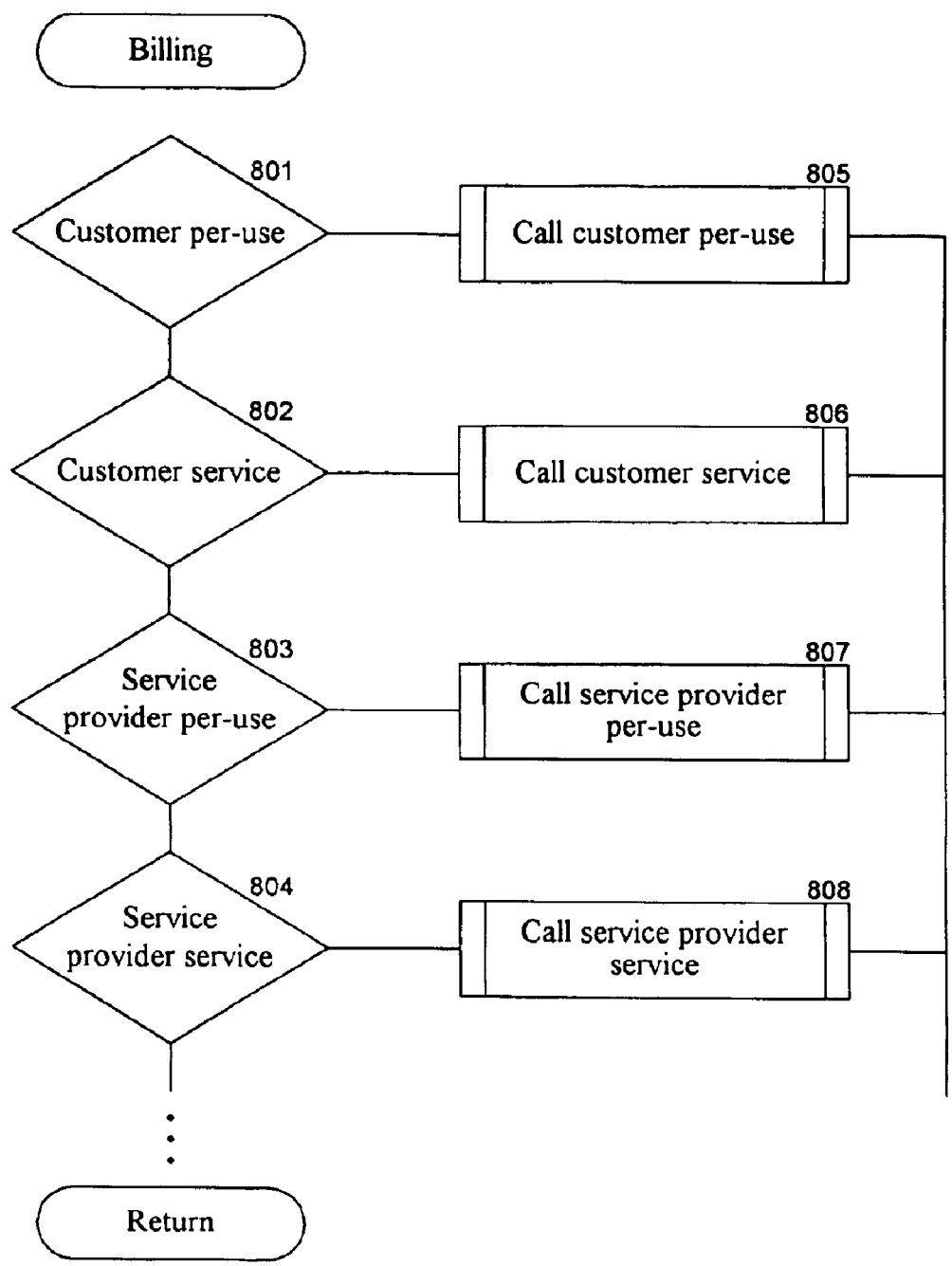
FIG. 8 is a flow diagram illustrating the billing component in one embodiment.

FIG. 8 is a flow diagram illustrating the billing component in one embodiment. This component identifies the type of billing to be used for the specific request and invokes a routine to process that billing. In decision blocks 801–804, the component identifies the type of billing to be used and invokes the appropriate billing routine in blocks 805–808. The component then returns.

From the above description, it will be appreciated that although specific embodiments have been described for purposes of illustration, various modifications may be made without deviating from the spirit and scope of the invention. For example, the HotBeads service may send beads included in "Features" to the requesters. Features are described in detail in the "Feature Management System for Facilitating Communication and Shared Functionality Among Components," which is incorporated by reference. Also, one skilled in the art will appreciate that embodiments can be used in many environments other than the home environment, such as office, manufacturing, and so on. Accordingly, the invention is not limited except by the appended claims.

What is claimed is:

1. A computer-implemented method for providing code to computer systems, comprising:

receiving base code and developer-specified characteristics of the base code from a developer;

translating the received base code into an intermediate code;

evaluating the intermediate code to determine whether the received base code satisfies the developer-specified characteristics;

notifying the developer whether the received base code satisfies the developer-specified characteristics;

receiving a request for target code from a requester, the request including requester-specified characteristics that the target code should satisfy;

selecting intermediate code that matches the requester-specified characteristics;

transforming the selected intermediate code to target code in accordance with the requester-specified characteristics; and sending the target code to the requester.

2. The method of claim 1 wherein the base code is source code and the target code is executable code.

3. The method of claim 1 wherein the evaluating includes determining whether the developer is authorized to submit base code.

4. The method of claim 1 wherein the developer-specified characteristics identify a functional category for the code.

5. The method of claim 4 wherein the functional categories include networking, communications, client-server, user interface, Internet browsing, electronic mail, audio, video, telephony, television, compression, encryption, logging, feature manager, hardware interface, or miscellaneous.

6. The method of claim 1 wherein the transforming includes optimizing the intermediate code in accordance with the requester-specified characteristics.

7. The method of claim 1 wherein the transforming includes compiling the intermediate code to produce executable target code in accordance with the requester-specified characteristics.

8. The method of claim 1 including billing for providing the target code to the requester.

9. The method of claim 8 wherein the billing includes compensating the developer for the sending of target code that is based on base code provided by the developer.

10. The method of claim 8 wherein the billing is based on per use receiving of target code by the requester.

11. The method of claim 8 wherein the billing includes differential billing based on the requester-specified characteristics.

12. The method of claim 1 wherein the transforming of the intermediate code uses beads of a Strings-based operating environment.

13. A computer-based method for providing code for computer systems, comprising:
    providing a collection of intermediate code;
    receiving a request for target code from a requester, the request including requester-specified characteristics that the target code should satisfy;
    selecting intermediate code that matches the requester-specified characteristics;
    transforming the selected intermediate code to target code in accordance with the requester-specified characteristics; and
    sending the target code to the requester.

14. The method of claim 13 wherein the selecting uses a least squares analysis based various characteristics of the intermediate code.

15. The method of claim 13 wherein the selecting is based on processor speed requirements, processor type, or memory requirements.

* * * * *